US011035236B2

(12) United States Patent
Thorton

(10) Patent No.: US 11,035,236 B2
(45) Date of Patent: Jun. 15, 2021

(54) BAFFLE FOR A COMPONENT OF A GAS TURBINE ENGINE

(71) Applicant: United Technologies Corporation, Farmington, CT (US)

(72) Inventor: Lane Thorton, Tolland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 217 days.

(21) Appl. No.: 16/419,131

(22) Filed: May 22, 2019

(65) Prior Publication Data

US 2019/0271232 A1    Sep. 5, 2019

Related U.S. Application Data

(62) Division of application No. 14/948,511, filed on Nov. 23, 2015, now Pat. No. 10,370,979.

(51) Int. Cl.
| | |
|---|---|
| *F01D 5/18* | (2006.01) |
| *F01D 9/04* | (2006.01) |
| *F01D 25/12* | (2006.01) |

(52) U.S. Cl.
CPC ............. *F01D 5/187* (2013.01); *F01D 5/189* (2013.01); *F01D 9/041* (2013.01); *F01D 25/12* (2013.01); *F05D 2220/32* (2013.01); *F05D 2230/80* (2013.01); *F05D 2240/12* (2013.01); *F05D 2240/122* (2013.01); *F05D 2240/126* (2013.01); *F05D 2240/301* (2013.01);
(Continued)

(58) Field of Classification Search
CPC .......... F01D 5/187; F01D 5/189; F01D 9/041; F01D 25/12; F05D 2240/12; F05D 2240/122; F05D 2240/126; F05D 2240/301; F05D 2240/304; F05D 2220/32; F05D 2230/80; F05D 2260/202
See application file for complete search history.

(56) References Cited

U.S. PATENT DOCUMENTS

| 3,732,031 A | 5/1973 | Bowling |
| 3,781,125 A | 12/1973 | Rahaim |

(Continued)

FOREIGN PATENT DOCUMENTS

| EP | 1847684 | 10/2007 |
| EP | 2025864 | 2/2009 |

(Continued)

OTHER PUBLICATIONS

European Search Report for European Patent Application No. 16200307.3 completed Mar. 21, 2017.

(Continued)

*Primary Examiner* — Moshe Wilensky
(74) *Attorney, Agent, or Firm* — Carlson, Gaskey & Olds, P.C.

(57) ABSTRACT

A method of repairing an airfoil according to an example of the present disclosure includes, among other things, providing an airfoil body, the airfoil body having external walls extending between a leading edge and a trailing edge, providing a baffle, the baffle including a baffle body defining an internal passage, and sidewalls of the baffle body defining a first contour, defining a cavity in the airfoil body, the cavity extending inwardly from the external walls to define a second contour complementary to the first contour, and inserting the baffle into the cavity. An airfoil arrangement is also disclosed.

20 Claims, 4 Drawing Sheets

(52) U.S. Cl.
CPC .. *F05D 2240/304* (2013.01); *F05D 2260/202* (2013.01); *Y02T 50/60* (2013.01)

(56) References Cited

U.S. PATENT DOCUMENTS

| | | |
|---|---|---|
| 4,020,538 A | 5/1977 | Dennis et al. |
| 5,752,802 A | 5/1998 | Jones |
| 6,575,702 B2 | 6/2003 | Jackson et al. |
| 7,021,893 B2 | 4/2006 | Mongillo, Jr. |
| 7,175,391 B2 | 2/2007 | Chlus et al. |
| 7,488,157 B2 | 2/2009 | Marini et al. |
| 8,152,468 B2 | 4/2012 | Propheter-Hinckley et al. |
| 8,777,569 B1 | 7/2014 | Liang |
| 9,017,024 B2 | 4/2015 | Cheng et al. |
| 9,109,453 B2 | 8/2015 | Spangler et al. |
| 2006/0285973 A1 | 12/2006 | Keller |
| 2008/0044291 A1 | 2/2008 | Lee et al. |
| 2008/0203236 A1 | 8/2008 | Mazzola et al. |
| 2013/0223987 A1 | 8/2013 | Stafford et al. |
| 2013/0294904 A1 | 11/2013 | Hunt et al. |
| 2015/0118064 A1 | 4/2015 | Levine et al. |
| 2015/0226085 A1 | 8/2015 | Spangler et al. |
| 2015/0267557 A1 | 9/2015 | Facchinetti et al. |

FOREIGN PATENT DOCUMENTS

| | | |
|---|---|---|
| EP | 2570594 | 3/2013 |
| EP | 2716868 | 4/2014 |
| EP | 2921649 | 9/2015 |
| WO | 2014126674 | 8/2014 |
| WO | 2015030926 | 3/2015 |
| WO | 2015157780 | 10/2015 |

OTHER PUBLICATIONS

Engineering properties of ALLOY 713C. Retrieved May 11, 2018 from: https://www.nickelinstitute.org/media/2487/alloys-713c_337.pdf.

Brochure. Haynes 188 alloy. Haynes International. Retrieved from: https://www.haynesintl.com/docs/default-source/pdfs/new-alloy-brochures/high-temperature-alloys/brochures/188-brochure.pdf.

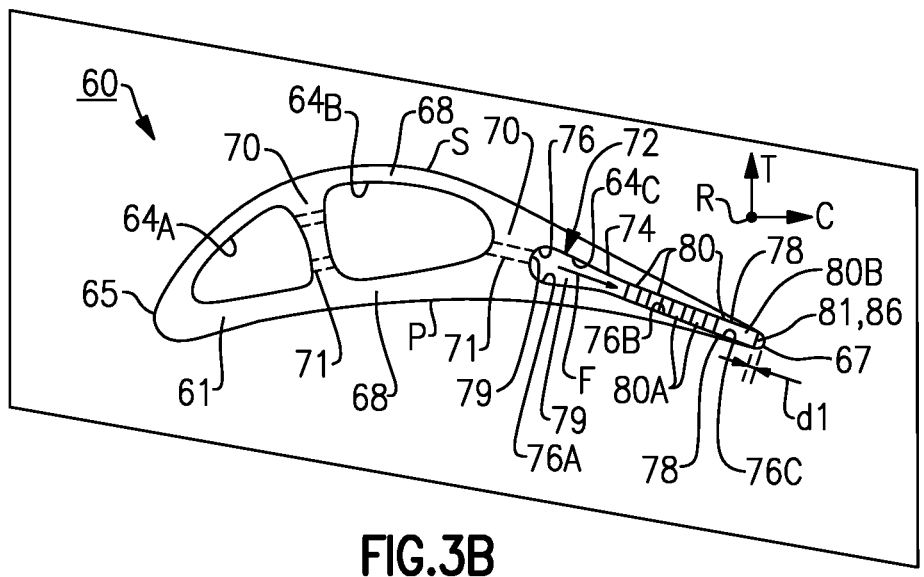
FIG.3B
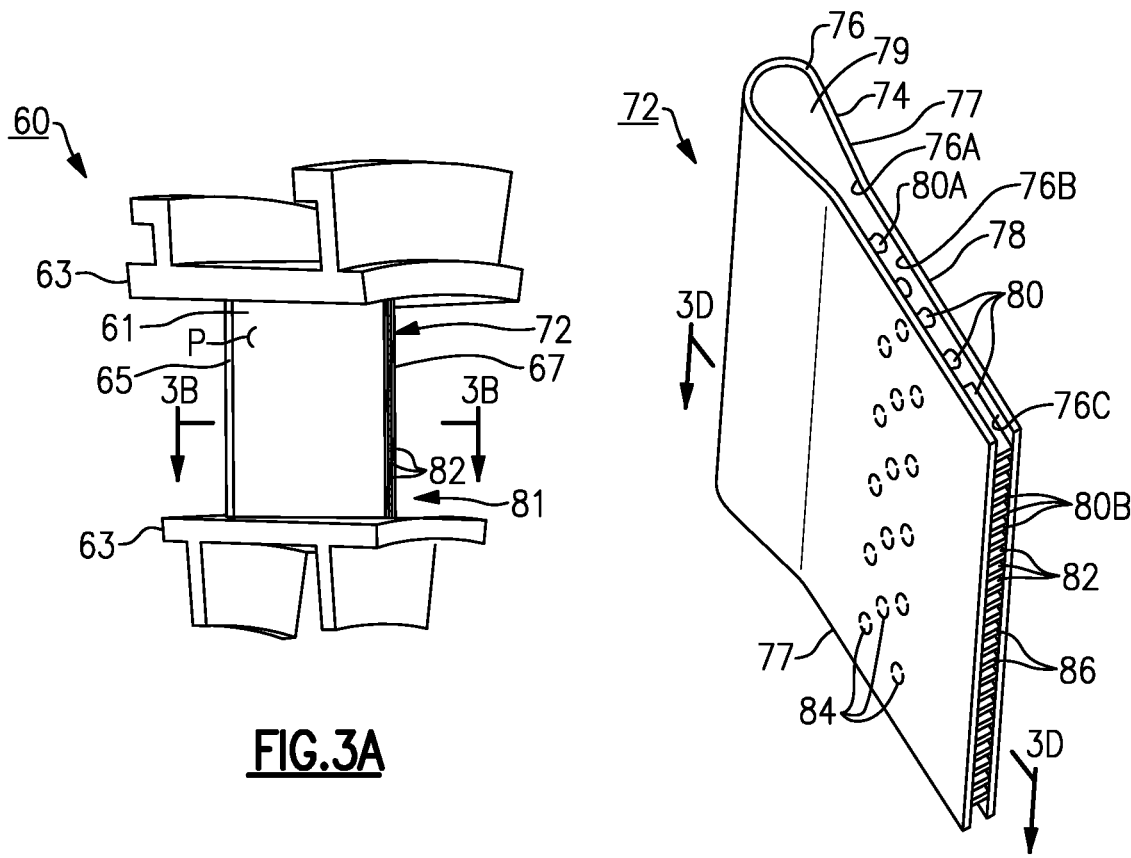
FIG.3A
FIG.3C

BAFFLE FOR A COMPONENT OF A GAS TURBINE ENGINE

CROSS-REFERENCE TO RELATED APPLICATION

This application is a divisional of U.S. patent application Ser. No. 14/948,511 filed Nov. 23, 2015.

BACKGROUND

This disclosure relates to cooling for a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

SUMMARY

An airfoil according to an example of the present disclosure includes an airfoil body defining a cavity, and a baffle including a baffle body including sidewalls and defining an internal passage for conveying coolant. The baffle body is situated in the cavity such that a majority of external surfaces of the sidewalls abut the cavity.

In a further embodiment of any of the foregoing embodiments, the sidewalls define an intermediate region between an inlet region and an exit region. The inlet region is configured to receive coolant, and the sidewalls are spaced apart at the exit region to define one or more exit ports configured to eject coolant outwardly of the cavity.

In a further embodiment of any of the foregoing embodiments, the inlet region tapers towards the intermediate region.

In a further embodiment of any of the foregoing embodiments, the airfoil body extends in a chordwise direction between a leading edge and a trailing edge, and at least some of the exit ports are situated adjacent to the trailing edge.

In a further embodiment of any of the foregoing embodiments, the exit region of the baffle body extends in the chordwise direction outwardly of the trailing edge.

In a further embodiment of any of the foregoing embodiments, the cavity is bounded by external walls of the airfoil body.

In a further embodiment of any of the foregoing embodiments, the sidewalls of the baffle body have a complementary geometry to the surfaces of the cavity.

In a further embodiment of any of the foregoing embodiments, the baffle body includes a plurality of cooling features within the internal passage.

In a further embodiment of any of the foregoing embodiments, at least some of the plurality of cooling features extend between opposed surfaces of the internal passage.

In a further embodiment of any of the foregoing embodiments, the airfoil body is made of a first material, and the baffle body is made of a second, different material.

In a further embodiment of any of the foregoing embodiments, the airfoil body extends between a platform and an airfoil tip. The cavity extends inwardly from the airfoil tip, and the baffle body is situated in the cavity such that the internal passage is configured to eject coolant adjacent the airfoil tip.

A gas turbine engine according to an example of the present disclosure includes a rotor spaced axially from a vane. At least one of the rotor and the vane includes an airfoil body. The airfoil body includes external walls extending between a leading edge and a trailing edge, the external walls defining a cavity, and a baffle including a baffle body defining an internal passage for conveying coolant. Sidewalls of the baffle body have a complementary geometry with the cavity.

In a further embodiment of any of the foregoing embodiments, sidewalls of the baffle body abut a majority of surfaces of the cavity.

In a further embodiment of any of the foregoing embodiments, the baffle body includes an inlet region and an exit region. The inlet region is configured to receive coolant, and the sidewalls are spaced apart at the exit region to define one or more exit ports configured to eject coolant adjacent to an external surface of the airfoil body.

In a further embodiment of any of the foregoing embodiments, the sidewalls taper from the inlet region towards the exit region.

In a further embodiment of any of the foregoing embodiments, the baffle body defines one or more exit ports configured to eject coolant outward of the cavity.

In a further embodiment of any of the foregoing embodiments, the airfoil body is made of a first material, and the baffle body is made of a second, different material having a lesser thermal resistance than the first material.

A method of repairing an airfoil according to an example of the present disclosure includes providing an airfoil body. The airfoil body has external walls extending between a leading edge and a trailing edge providing a baffle. The baffle includes a baffle body defining an internal passage. Sidewalls of the baffle body define a first contour defining a cavity. The cavity extends inwardly from the external walls to define a second contour complementary to the first contour. The method includes inserting the baffle into the cavity.

In a further embodiment of any of the foregoing embodiments, the step of defining the cavity includes removing material from the trailing edge to define an opening to the cavity, and the sidewalls of the baffle body are spaced apart by an exit wall to define one or more exit ports situated adjacent to the opening.

In a further embodiment of any of the foregoing embodiments, the airfoil body is made of a first material, and the baffle body is made of a second, different material.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 3A illustrates a perspective view of an airfoil and a baffle.

FIG. 3B illustrates a cross-sectional view of the airfoil of FIG. 3A taken along line 3B-3B.

FIG. 3C illustrates an isolated perspective view of the baffle of FIG. 3A.

DETAILED DESCRIPTION

Figure 1:
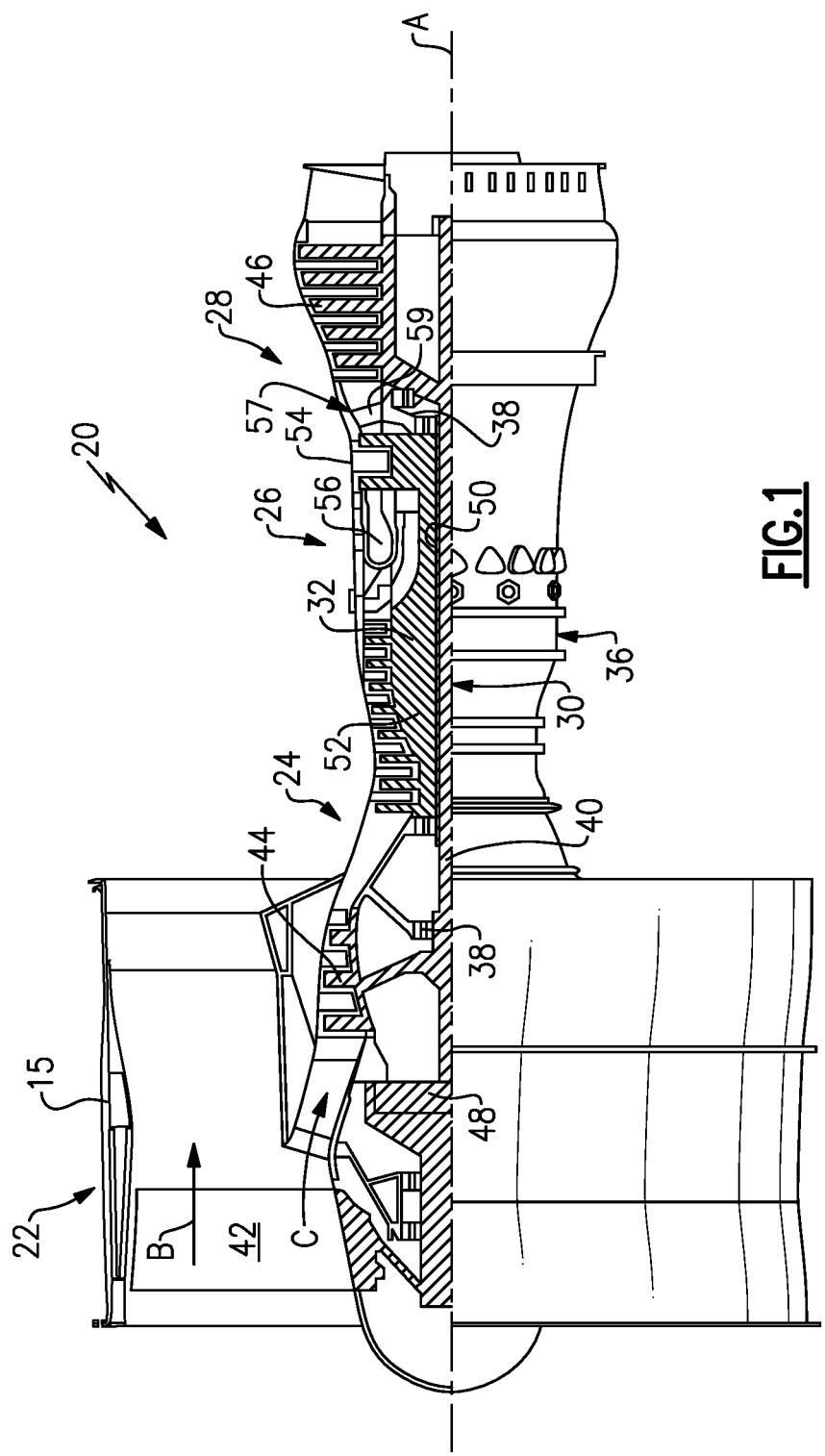
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The concepts described herein are not limited to use with turbofans and may be applied to other types of turbine engines, such as three-spool architectures. Alternative engines might also include an augmenter section (not shown) among other systems or features, or, may not include the fan section 22, such as in industrial gas turbine engines.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a first (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]0.5$. The "Low corrected fan tip speed" as disclosed herein according to one non-limiting embodiment is less than about 1150 ft/second.

Figure 2:
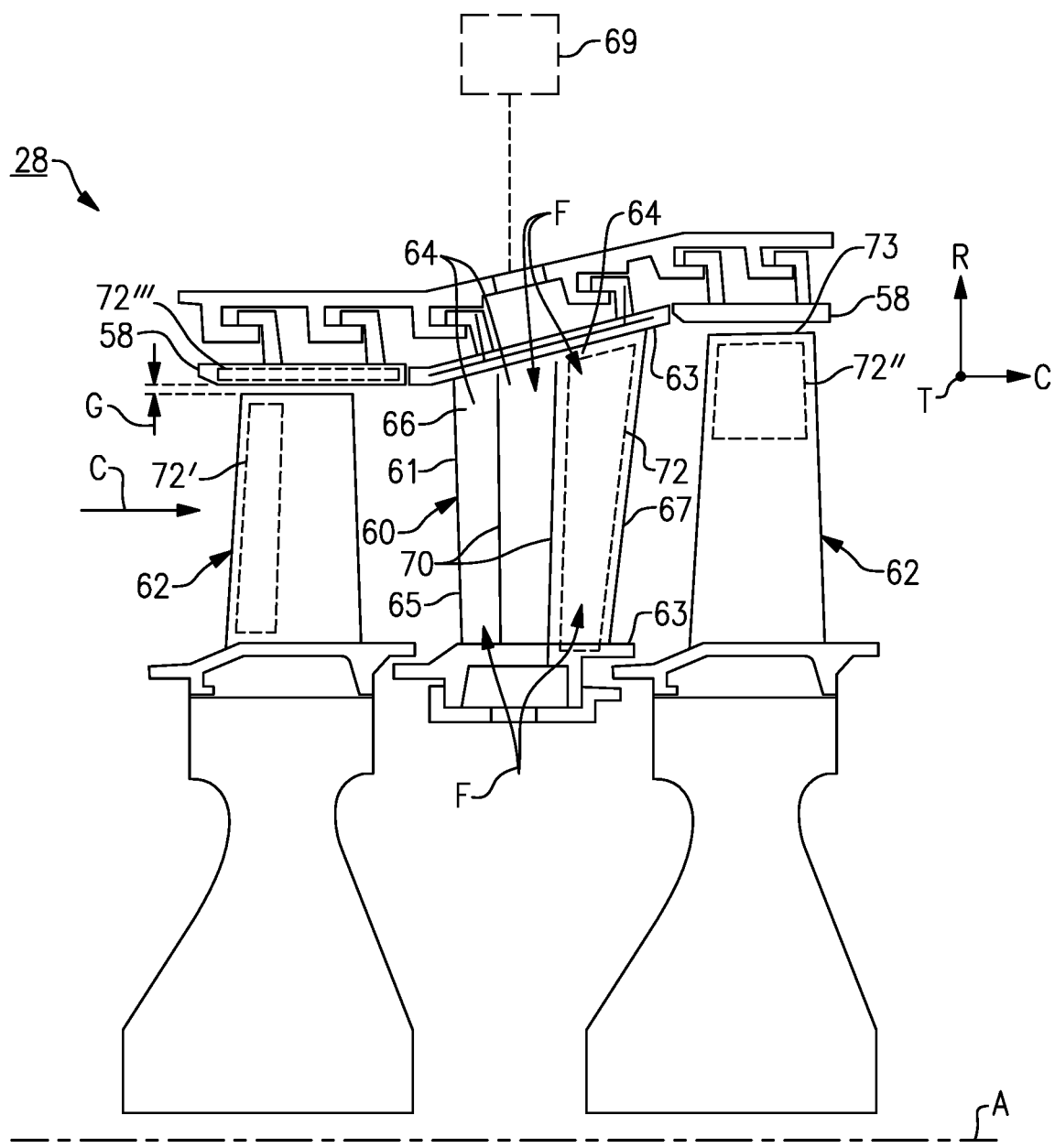
FIG. 2 schematically shows an airfoil arrangement for a turbine section.

FIG. 2 illustrates a portion of the turbine section 28, such as one of the high or low pressure turbines 46, 54, which includes an airfoil 60. In this disclosure, like reference numerals designate like elements where appropriate and reference numerals with the addition of one-hundred or multiples thereof designate modified elements that are understood to incorporate the same features and benefits of the corresponding original elements. In this example, the airfoil 60 is a vane that is situated between two rotatable blades 62. Blade outer air seal (BOAS) 58 is spaced radially outward from tip 73 of the blade 62 to define a clearance gap G and to bound a portion of the core flow path C. The turbine section 28 includes multiple airfoils or vanes 60, blades 62, and blade outer air seals 58 arranged circumferentially about the engine axis A. Although the examples herein are described with respect to the airfoil 60 as a vane, the examples are also applicable to rotatable blades 62 and airfoils in other sections of the turbine section 28 or the compressor section 24. Other portions of the engine 20 may benefit from the teachings herein, such as combustor panels in the combustor section 26.

The airfoil 60 includes an airfoil body 61 extending in a radial direction R between platforms 63. The airfoil body 61 extends in a chordwise direction C between a leading edge 65 and a trailing edge 67, and in a circumferential or thickness direction T between pressure and suction sides P, S (FIG. 3B). The airfoil body 61 defines one or more internal passages or cavities 64 that serve to convey a fluid flow F from a coolant source 69 through the airfoil 60. For example, the coolant source 69 can be relatively cool air from the compressor section 24, an upstream stage of the turbine section 28, or bypass flow B from the fan section 22. Although not limited, the internal cavities 64 in this example are defined by one or more internal walls or ribs 70. The fluid flow F is thus conveyed through the internal cavities 64 and is then discharged into the core flow path C through holes or openings in the airfoil body 61. In alternative examples, the airfoil body 61 defines a serpentine passage or cavity that winds radially back and forth within the airfoil body 61 with one or more ribs separating the passage sections. Although the internal cavities 64 are depicted as extending in the radial direction R, it should be appreciated that the internal cavities can be arranged at different orientations relative to each other and/or relative to the engine axis A to provide the desired cooling augmentation.

Figure 3D:
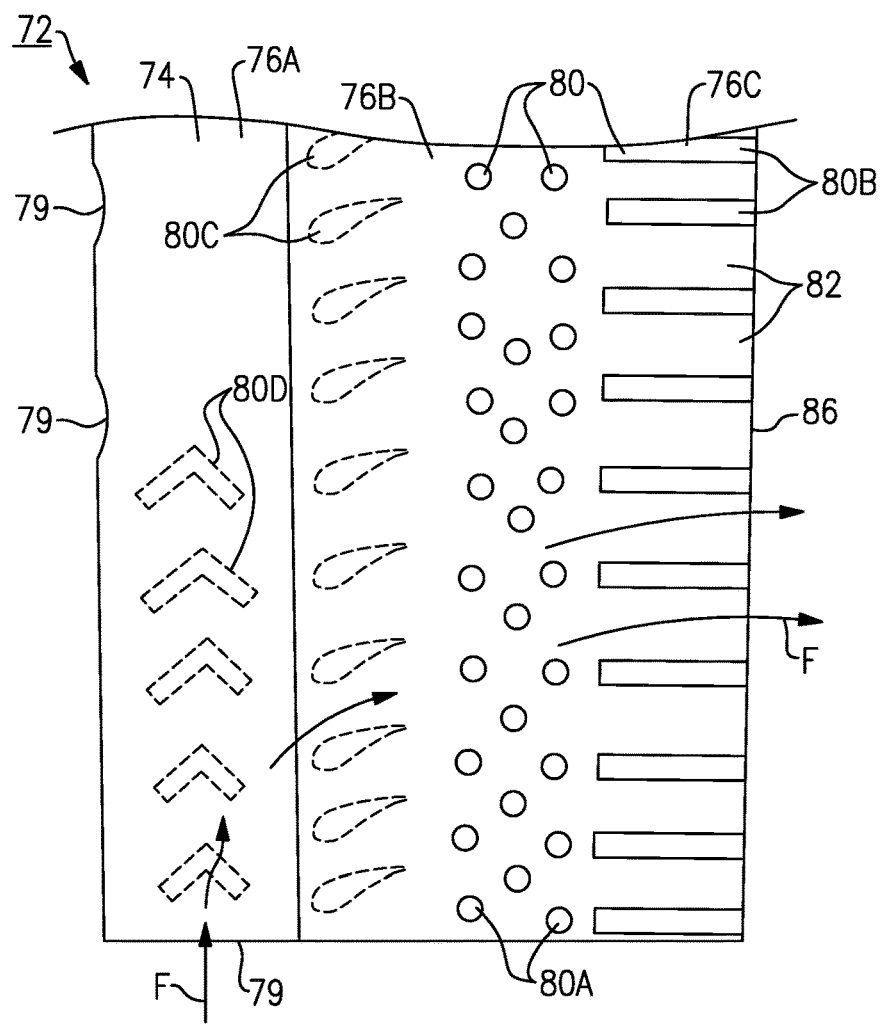
FIG. 3D illustrates a sectioned, axial view of selected portions of the baffle of FIG. 3C taken along line 3D-3D.

Referring to FIGS. 3A-3D, a baffle 72 is situated in one of the internal cavities 64 of the airfoil 60. FIG. 3A illustrates a perspective view of the airfoil 60. FIG. 3B illustrates a sectioned, radially inward view of the airfoil 60 taken along line 3B-3B. FIG. 3C illustrates an isolated perspective view of the baffle 72. FIG. 3D illustrates a sectioned, axial view of the baffle 72 taken along line 3D-3D. In the illustrated example, the airfoil body 61 defines internal cavities 64A-64C which can be connected by one or more crossover passages 71 (shown in dashed lines) to convey fluid flow between one or more of the internal cavities 64A-64C. Although three internal cavities 64A-64C are shown, the airfoil 60 can define fewer or more than three internal cavities 64 and at various locations of the airfoil 60. The internal cavities 64A-64C are bounded by external walls 68 and internal walls 70 of the airfoil body 61.

The baffle 72 is situated in the internal cavity 64C adjacent to the trailing edge 67 of the airfoil 60. The baffle 72 can be situated in other locations of the airfoil 60, such as in intermediate internal cavity 64B between pressure and suction sides P, S of the airfoil 60, and/or forward internal cavity 64A adjacent to the leading edge 65. In some examples, baffles 72', 72" are situated adjacent to airfoil tip 73 or leading edge of blade 62 (FIG. 2). In one example, the baffle 72 extends at least partially through one or more of the platforms 63 (FIG. 2). In another example, baffle 72" is situated along or otherwise adjacent to tip 73 of blade 62 to eject coolant into the clearance gap G (FIG. 2). In one example, baffle 72''' extends at least partially through BOAS 58 (FIG. 2), and can be configured to eject coolant adjacent a trailing edge face or mate face of BOAS 58, for example.

The baffle 72 is configured to occupy a volume of the internal cavity 64 to provide a desired cooling augmentation to portions of the airfoil 60 adjacent to the baffle 72 or other heat loads. The baffle 72 includes an elongated baffle body 74 extending between ends 77 (FIG. 3C) and is sized to be received or situated in the internal cavity 64C. A cross-section of the internal cavity 64C taken parallel to plane T, C defines a first contour, and the baffle body 74 defines a second contour complementary to the first contour. In this arrangement, the baffle body 74 has a complementary geometry to surfaces of the internal cavity 64C. The first and second contours can be taken as cross-sections parallel to plane T, C and along one or more intervals parallel to the radial axis R, for example. In some examples, the first and second contours are substantially equal or equal at one or more of the ends 77 (shown in FIG. 3B), at a majority of the intervals, or at each position between ends 77. In the illustrated example, a cross-section of the baffle body 74 is substantially constant between ends 77.

In some examples, a volume of the baffle body 74 is substantially equal or equal to a volume of the internal cavity 64C. The baffle body 74 is situated in the internal cavity 64C such that a majority or substantially each external surface of sidewalls 78 of the baffle body 74 abuts or directly contacts adjacent surfaces of the cavity 64C. In this arrangement, fluid flow F through the internal passage 76 provides convective cooling to portions of the airfoil 60 adjacent to the internal cavity 64C.

The baffle body 74 defines at least one internal passage 76 for conveying fluid flow F. The internal passage 76 is bounded by sidewalls 78 of the baffle body 74. In the illustrated example, the sidewalls 78 define inlet region 76A, intermediate region 76B and exit region 76C of the internal passage 76. The inlet region 76A can be provided with one or more inlet ports 79 for receiving fluid flow F from the coolant source 69. The inlet region 76A can be configured to communicate fluid flow F from the inlet ports 79 to the intermediate region 76B. The inlet ports 79 can be defined at one or more of the ends 77 or sidewalls 78 (FIG. 3D). In alternative examples, some of the inlet ports 79 receive fluid flow, and other inlet ports 79 feed another cavity 64 with fluid flow, such as crossover passage 71 coupling internal cavities 64B and 64C to provide a desired relative cooling augmentation. In some examples, fluid flow is fed from openings at ends 77 of the baffle body 74 to another cavity 64, such as along the inlet or intermediate regions 76A, 76B.

The sidewalls 78 at the inlet region 76A can taper towards the intermediate region 76B to provide a desired pressure differential between regions 76A and 76B or a desired surface area, for example. The tapered arrangement can also be utilized to retain the baffle 72 within the internal cavity 64C or otherwise limit relative movement of the baffle 72 and the airfoil 60. In examples, the internal passage 76 between the inlet region 76A and the exit region 76C is fluidly isolated from the internal cavity 64C. In other examples, sidewalls 78 define one or more impingement cooling holes 84 (shown in dashed lines in FIG. 3C) to provide impingement cooling to adjacent surfaces of the internal cavity 64C.

The baffle 72 can include one or more cooling features 80 within the internal passage 76. The cooling features 80 can be situated to provide additional surface area for convective cooling and/or direct or meter fluid flow within or through localized regions of the internal passage 76. Various cooling features 80 can include pedestals 80A and ribs 80B extending between opposed surfaces of the internal passage 76, for example. Other cooling features 80 can include features having a curved or complex geometry 80C (shown in dashed line) to direct flow through the internal passage 76, and trip strips 80D (shown in dashed line) or dimples protruding from surfaces of the internal passage 76 to cause turbulence in the fluid flow F.

The exit region 76C includes one or more exit ports 82 configured to eject fluid flow F outwardly of the internal passage 76. In the illustrated example, sidewalls 78 are spaced apart at the exit region 76C by exit wall 86 to define one or more exit ports 82 between ribs 80B situated at the trailing edge 67. The ribs 80B can be arranged such that the exit ports 82 eject fluid flow F from exit wall 86 at a desired orientation and/or velocity. In alternative examples, the exit ports 82 are configured to eject fluid flow adjacent to another external surface of the airfoil body 61, such as surfaces of the pressure or suction sides P, S of airfoil body 61 or blade tip 73.

Figure 4A:
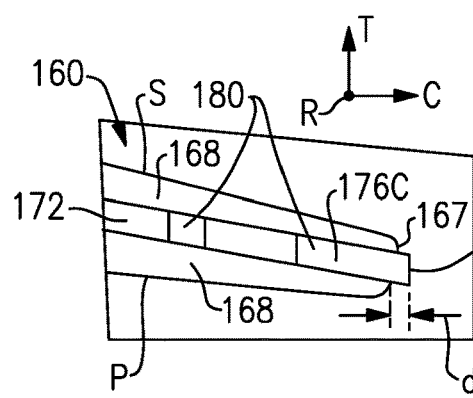
FIG. 4A illustrates an airfoil and a baffle according to a second example.
Figure 4B:
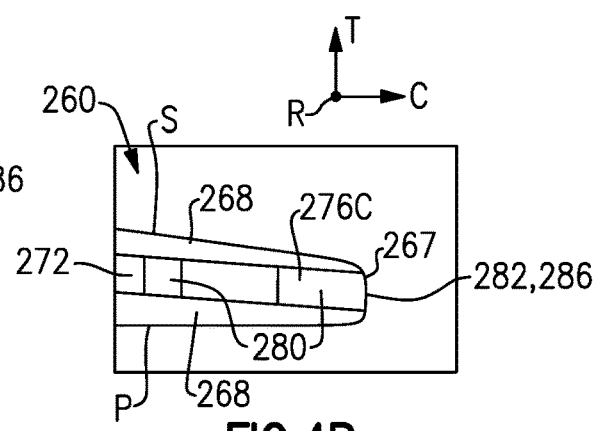
FIG. 4B illustrates an airfoil and a baffle according to a third example.

The exit region 76C can be arranged at a desired location relative to external surfaces of the airfoil 60 such as the trailing edge 67. For example, the exit region 76C can be spaced a distance d1 in the chordwise direction C inwardly of the trailing edge 67 (FIG. 3B). In alternative examples, exit region 176C extend a distance d2 in the chordwise direction C outwardly of the trailing edge 167 (FIG. 4A) such that baffle 172 defines an axially aftmost portion of the trailing edge 167 and is exposed to the core flow path C. In another example, surfaces of exit wall 86 of the exit region 276C are substantially flush with the trailing edge 267 (FIG. 4B). By arranging the exit region 76C/176C/276C relative to the trailing edge 67/167/276, a relative circumferential distance between adjacent airfoils 60 can be selected to define a desired area of the airfoil stage.

The internal cavity 64 of airfoil 60 can be cast, machined or formed by an additive manufacturing technique, for example. The baffle 72 can be situated in the internal cavity 64 utilizing a casting or additive manufacturing technique, for example. In other examples, the baffle 72 is situated in the internal cavity 64 subsequent to fabrication of the airfoil body 61. The baffle 72 can be utilized to form a sleeve or insert within the internal cavity 64 such that different baffle configurations can be utilized with a common predefined contour of the internal cavity 64. In this manner, the material and/or cooling characteristics of the baffle 72 can be modified without having to modify a geometry of the airfoil 60. The techniques described herein can reduce fabrication cost and complexity by reducing casting die or casting core rework in an investment casting process, for example. The techniques described herein can also improve cycle time during iterations of airfoil redesign and retrofit.

In example repair techniques, material is removed from the airfoil body 61 to define the internal cavity 64. Material can be removed from external surfaces of the airfoil body 61 to define an opening 81 to the internal cavity 64, such as at the trailing edge 67 of airfoil 60 with exit ports 82 situated at the opening 81 (FIGS. 3A-3B), for example. In some examples, the airfoil 60 or airfoil body 61 is made of a first material, and the baffle body 74 is made of a second, different material. The first material of the airfoil 60 can be a high temperature material such as a nickel based alloy cast as a single crystal, for example. The second material of the baffle body 74 can be selected to have a lesser thermal resistance than the first material, or which may be relatively lower cost or weight, for example. In some examples, the baffle 72 is fabricated of a metal or metal alloy, such as sheet metal, a multiple crystal nickel alloy or cobalt based alloy, formed by additive manufacturing, by casting, or the like. During installation, the baffle 72 is moved into the internal cavity 64C, such as from a radially outward to a radially inward direction relative to axis R. The baffle 72 can be sized to form an interference fit with the internal cavity 64C. In alternative examples, the baffle 72 is fixedly attached to the airfoil 60 by welding, fasteners, or the like. In some examples, the baffle 72 is removable from the airfoil 60.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of repairing an airfoil for a gas turbine engine, comprising:
   providing an airfoil body, the airfoil body having external walls extending between a leading edge and a trailing edge, wherein the airfoil body extends in a chordwise direction between the leading edge and the trailing edge, the airfoil body extends in a thickness direction between pressure and suction sides defined by the external walls;
   providing a baffle, the baffle including a baffle body defining an internal passage in the baffle body for conveying coolant, and sidewalls of the baffle body defining a first contour;
   defining a first cavity and defining a second cavity in the airfoil body such that each of the first and second cavities is bounded by the external walls, the first cavity extending inwardly from the external walls to define a second contour complementary to the first contour, and the airfoil body includes an internal rib spanning between the pressure and suction sides to bound the first cavity and the second cavity; and
   inserting the baffle into the first cavity such that a majority of external surfaces of the sidewalls abut internal surfaces of the airfoil body that define the first cavity, wherein the internal passage along the sidewalls is fluidly isolated from the first cavity.

2. The method as recited in claim 1, wherein:
   the step of defining the first cavity includes removing material from the trailing edge to define an opening to the first cavity; and
   the sidewalls of the baffle body are spaced apart by an exit wall to define one or more exit ports situated adjacent to the opening.

3. The method as recited in claim 2, wherein the inserting step occurs subsequent to the removing material from the trailing edge to define the opening to the first cavity.

4. The method as recited in claim 3, wherein the airfoil body is made of a first material, and the baffle body is made of a second, different material.

5. The method as recited in claim 1, wherein the baffle is sized to form an interference fit with surfaces of the first cavity.

6. The method as recited in claim 1, wherein the sidewalls of the baffle body have a complementary geometry to the internal surfaces of the airfoil body that define the first cavity.

7. The method as recited in claim 6, wherein the sidewalls define an intermediate region between an inlet region and an exit region, the inlet region is configured to receive coolant, and the sidewalls are spaced apart at the exit region to define one or more exit ports configured to eject coolant outwardly of the first cavity adjacent to the trailing edge.

8. The method as recited in claim 7, wherein the inlet region tapers towards the intermediate region.

9. The method as recited in claim 7, wherein the exit region of the baffle body extends in the chordwise direction outwardly of the trailing edge.

10. The method as recited in claim 1, wherein the baffle body includes a plurality of cooling features within the internal passage.

11. The method as recited in claim 10, wherein at least some of the plurality of cooling features are pedestals extending between opposed surfaces of the internal passage.

12. The method as recited in claim 1, wherein the airfoil body extends in a radial direction between a platform and an airfoil tip, the first cavity extends inwardly from the airfoil tip, and the baffle body is situated in the first cavity such that the internal passage is configured to eject coolant in a direction radially outward from the airfoil tip.

13. The method as recited in claim 1, wherein the airfoil body is made of a first material, and the baffle body is made of a second, different material having a lesser thermal resistance than the first material.

14. The method as recited in claim 13, wherein the baffle is sized to form an interference fit with surfaces of the first cavity.

15. The method as recited in claim 1, wherein the baffle is removable from the airfoil body.

16. The method as recited in claim 15, wherein the baffle is sized to form an interference fit with surfaces of the first cavity.

17. The method as recited in claim 14, wherein the step of defining the first cavity includes removing material from the trailing edge to define an opening to the first cavity.

18. The method as recited in claim 17, the sidewalls of the baffle body are spaced apart by an exit wall to define one or more exit ports situated adjacent to the opening.

19. The method as recited in claim 18, wherein the baffle body includes a plurality of cooling features within the internal passage.

20. The method as recited in claim 17, wherein the baffle is removable from the airfoil body.

\* \* \* \* \*